(12) United States Patent
Elliott et al.

(10) Patent No.: US 7,233,242 B2
(45) Date of Patent: Jun. 19, 2007

(54) ARRANGEMENT AND METHOD FOR SETTING A TRANSMIT POWER

(75) Inventors: Mark Elliott, Grasslfing/Pentling (DE); Matthias Münch, Obertraubling (DE); Wolfgang Reiml, Regensburg (DE); Dieter Sass, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 10/954,083

(22) Filed: Sep. 29, 2004

(65) Prior Publication Data

US 2005/0068157 A1    Mar. 31, 2005

(30) Foreign Application Priority Data

Sep. 30, 2003    (DE)    ................ 103 45 536

(51) Int. Cl.
*G08B 1/08*    (2006.01)
*H04B 3/00*    (2006.01)
*H04Q 7/20*    (2006.01)

(52) U.S. Cl. .................... 340/539.21; 340/425.2; 340/10.34; 340/333; 455/127.1

(58) Field of Classification Search .......... 340/539.21, 340/425.2, 425.3
See application file for complete search history.

(56) References Cited

U.S. PATENT DOCUMENTS 5,634,195 A * 5/1997 Sawyer ................. 455/522
5,822,318 A * 10/1998 Tiedemann et al. ......... 370/391
6,341,214 B2 * 1/2002 Uesugi ..................... 455/69

FOREIGN PATENT DOCUMENTS

DE    44 30 360 C1    10/1995
DE    196 02 316 C1    6/1997

* cited by examiner

*Primary Examiner*—Donnie L. Crosland
(74) *Attorney, Agent, or Firm*—Baker Botts L.L.P.

(57) ABSTRACT

A transmit antenna (3) is supplied with energy by a power supply unit (2). An electrical value characteristic for the transmit power is compared to a comparison value and the length of a time interval is measured in which the characteristic value at least reaches or exceeds the comparison value. Depending on the length of this time interval the transmit power is set.

24 Claims, 3 Drawing Sheets

ARRANGEMENT AND METHOD FOR SETTING A TRANSMIT POWER

PRIORITY

This application claims priority to German Application No. 103 45 536.1 filed Sep. 30, 2003.

TECHNICAL FIELD OF THE INVENTION

The invention relates to a method and a arrangement for setting a transmit power of a transmit antenna. The invention particularly relates to the use of the transmit antenna in automotive technology for transmission of electrical energy by means of electromagnetic waves from a base station to a transponder unit.

BACKGROUND OF THE INVENTION

An anti-theft system for a motor vehicle is known from DE 44 30 360 C1, where a stationary transmitter in a lock comprises a resonant circuit which is inductively linked to an resonant circuit of a portable transponder in a key. In the transmitter an oscillation is triggered by an excitation variable of which the energy is transmitted to a transponder which, for its part, transmits coded data back to the transmitter.

Below a specific power threshold the energy transmitted to the transponder device is too small for a transmission of code information by the transponder device. To guarantee a secure exchange of energy and data between the base station and the transponder unit the transmit power of the base station must thus be set to a specific minimum value.

DE 196 02 316 C1 discloses a device for transmission of data or energy which can be used especially for an anti-theft system for a motor vehicle, in which coded information is sent from a key to a lock and in the opposite direction. The document proposes the use of a stationary transceiver with a first resonant circuit which is excited to an oscillation by an excitation variable with an excitation frequency. During the manufacturing of the transceiver, deviations from required values in components of the resonant circuit can occur as a result of component tolerances. After the transceiver has been manufactured it must therefore be first established whether its resonant frequency deviates by more than a specified amount from the excitation frequency. To this end the amplitude of the current through the antenna or the voltage at a capacitor of the resonant circuit is measured. If the current or the voltage deviates from a required value, a correction value is created. In accordance with an exemplary embodiment described in DE 196 02 316 C1, after the transceiver has been manufactured, it must first be established whether a resonance frequency deviates from the excitation frequency by more than a specified amount. The antenna resonant circuit can be changed in two different ways independently of the correction value so that energy and data are transmitted in the most effective way possible. On the one hand the resonant frequency of the antenna resonant circuit can be approximated to the excitation frequency and on the other hand the current through the antenna, i.e. the excitation current, can be increased. A measuring device with a microprocessor can be used for measuring current and voltage, which records the current via an A/D converter and undertakes to connect a capacitor and/or an inductor or to control the excitation current.

SUMMARY OF THE INVENTION

The object of the invention is to specify a method and an arrangement which make it possible to adjust the power of the transmit antenna, especially during operation, as simply and quickly as possible. The method and the arrangement are to be used especially for transmission of electrical energy by means of electromagnetic waves to a transponder device.

It is proposed that a characteristic electrical value for the transmit power is compared with a comparison value, a length of an interval is measured in which the characteristic value at least reaches or exceeds the comparison value and the transmit power is set depending on the length of the interval.

The characteristic electrical value is typically an electrical voltage or an electrical current and in particular a numerical value corresponding to the electrical voltage or the electrical current is used which can be processed as a digital value by a microprocessor. The characteristic electrical value can comprise any given time curve.

As already described above, the characteristic value is compared with a comparison value. The comparison value can be an electrical reference voltage or a reference current.

The comparison value can be determined for example before or at the beginning of operation of the transmit antenna. Alternatively or additionally the length of the time interval can be measured during the operation of the transmit antenna for different comparison values in each case and a measure for the transmit power determined in this way. The underlying problem with this alternative is that the transmit power can in some cases only be set in the desired way with the aid of the comparison value if the characteristic electrical value at least exceeds the comparison value. For example, at the start of transmit mode the transmit power can be so low that the characteristic electrical value at no time exceeds the comparison value. Then for example a second, lower comparison value can be chosen so that the characteristic electrical value exceeds the second comparison value at times, which, as described above, enables the length of the time interval to be measured. Alternatively the transmit power can be increased for as long or as often as it takes for the characteristic value to exceed the comparison value.

The method is used especially for setting the transmit power during the operation of a transmit antenna. External disturbance variables (e.g. thermal variations and off resonances of the inductivity caused by proximity to metallic or magnetic objects) can arise for which the influence can be compensated for or eliminated by the regulation described later with a comparison value which lies close to a required value or a maximum value. Typical examples of further influencing factors which require an individual setting for a specific transmit antenna are for example manufacturing tolerances.

An especially suitable characteristic value for the method in accordance with the invention is a non-constant, periodic electrical characteristic value, such as for example an electrical voltage which can be tapped from the send antenna or a part of the send antenna. A corresponding periodic curve can occur or be a requirement especially for the following description of embodiments of the method in accordance with the invention.

With the method in accordance with the invention—as described above—a length of a period of time is measured in which the characteristic value at least reaches or exceeds the comparison value or in which the characteristic value exceeds the comparison value. The term "exceed" also includes the case where the characteristic value is initially greater than the comparison value, gets smaller as time progresses and in doing so falls below it (the comparison value or the limit value). In addition "exceed" does not just include the process or reaching the comparison value and changing the side (previously greater than the comparison value and subsequently less than the comparison value or vice versa), but also includes the state in which the comparison value is exceeded. To put it another way, there are three possible cases: The comparison value is the same as the instantaneous value of the characteristic value, the comparison value is exceeded and the comparison value is not exceeded.

By measuring the length of the time interval and the setting of the transmit power which depends on this the transmit antenna or a transmit arrangement combined with it can be operated in an especially simple and reliable way. Time intervals can be evaluated precisely and their length can be used for control or regulation of the transmit power.

In particular the length of the time interval is measured digitally by a digital data processing device and a corresponding digital length value used as an input value to set the transmit power.

The characteristic value is still available in analog form as a rule. A conversion into a digital signal has preferably already been undertaken by a comparison device which compares the characteristic value with the comparison value. For example the comparison device comprises a digital comparator which receives the two analog signals to be compared (the comparison value and the characteristic value) and depending on the result of the comparison, outputs a first or second digital comparison value (e.g. "0" or "1"). The invention is not however restricted to this embodiment. Alternatively analog characteristic values can for example be digitized and compared with a digital comparison value.

The length of a time interval during which the periodic characteristic value exceeds the comparison value within a period or a part of a period is a measure of the transmit power. A relationship between the transmit power and the length of the time interval can for example be determined empirically or mathematically. With this information the desired transmit power (required value or maximum value) can now be set, especially by controlling the energy delivered by a power supply unit to the transmit antenna.

The advantage of this method is that it allows the effort of analog processing of the characteristic values for the transmit power to be dispensed with. In particular when an Application-Specific Integrated Circuit (ASIC) is used for comparison of the characteristic value with the comparison value, for measurement of the length of the time interval and for setting of the transmit power, the expense involved in manufacturing and development of the arrangement is reduced compared to analog technology.

Especially when a known relationship between the transmit power and the length of the time interval for setting the transmit power of the transmit antenna is used, a required value of maximum value of the transmit power can be set especially quickly. With conventional closed-loop control technology on the other hand the transmit power has to be slowly approximated to the required value or the maximum value to prevent an overshoot of the transmit power, which for example violates technical standards or regulations for transmit devices. This approximation is expensive and takes time. In the embodiment in accordance with the invention an adjustment signal for the excitation power can already be generated from an individual measurement. With this individual adjustment signal the transmit power reaches the desired required value or maximum value at least except for a small deviation in a single additional adjustment step, i.e. without further iteration.

The proposed method and the proposed transmit arrangement, because of their simplicity and the time saved, are suitable for permanent use during transmit operation. In particular it is possible to execute the proposed method regularly at the beginning of transmit operation and/or repeatedly during transmit operation.

The easy-to-implement layout and the time savings resulting from the speed of the method are of especial benefit in automotive technology. One example of an application is the activation of a number of transponder devices in rapid succession (for example to record tire pressure and tire temperature) by a single base station. The transmit frequencies used for this application are typically around 125 kHz. The desired transmit power of the base station must be reached very accurately and quickly with this application, since the base station also supplies the transponder device with energy. On the other hand the transponder device is not sufficiently supplied with energy and sending a reply signal of the transponder device is thus impossible. On the other hand the transmit power must be set in many cases so that it does not exceed a specified maximum transmit power at any given point in time, since otherwise technical standards or regulations for transmit systems would be violated. This condition is also fulfilled by the method described.

In a development of the invention which relates to the case of a periodic characteristic value, the electrical characteristic value is repeatedly compared with the comparison value, in which case the comparison is sometimes made possible by the periodic sequence of the characteristic value or controlled by another periodic control variable. In particular the comparison is sometimes not possible.

This can be implemented for example by using a comparison device with a so-called enable input. The comparison is only made if a specific signal or a signal with a specific transmit level (e.g. a signal level above a minimum level) is present. This signal at the enable input can for example be the excitation signal of the transmit device itself. In automotive technology these excitation signals are frequently voltage signals with a square-wave timing characteristic. These can be used very easily to perform the comparison only during specific segments of the period (e.g. only during a half period). This timing restriction of the comparison makes it easier to determine the transmit power from the measured length of the time interval. This method is especially advantageous if the characteristic value exceeds the comparison value several times during a period, in which case only one of the corresponding time intervals is to be or can be evaluated. By using the signal at the enable input for example only the time interval within one period is evaluated.

As an alternative to the development of the method described above, in which the comparison is enabled at certain times, the measurement of the length of the time interval, during which the characteristic value within a period at least reaches or exceeds the comparison value or in which the characteristic value exceeds the comparison value is enabled at certain times. For example the method can be designed so that the characteristic value is compared with the comparison value without interruption, whereas the length of the time interval is only measured when a specific signal (e.g. "1" or "high") is present at a control unit to control the measurement of the length of the time interval.

In an advantageous embodiment of the method the comparison value is initially selected such that it corresponds to a transmit power lying below a required value or a maximum value, the length of the time interval is measured for the initial transmit power and the length of the time interval is used to determine the value to which a setting variable and thereby the transmit power is to be set, so that the required value or maximum value of the transmit power is attained.

In particular the power supply unit of the transmit antenna is set so that a low start power is to be expected. The length of the time interval is then measured at this low start power. The length of the time interval is then used to determine how the transmit power is to be increased so that the required value or maximum value of the transmit power is reached. The advantage of this method is that the transmit power does not exceed the required value or maximum value right at the start, thereby even possibly damaging the transmit device or violating technical standards or specifications for the transmit equipment. This embodiment of the method can be executed in particular each time transmit mode is started.

It is especially advantageous for the comparison value to be selected so that it corresponds to half of the required value or of the maximum value of the transmit power or to a value deviating by not more than 10% from half of the required value or of the maximum value of the transmit power. In this case, if the characteristic value does not initially exceed the comparison value (i.e. if the time interval has length of zero), the transmit power can be readily doubled without a maximum transmit power value being exceeded.

In a further embodiment of the method the comparison value is selected so as to correspond to a value lying below the required value or maximum value of the transmit power. The length of the time interval is measured for a set transmit power. Then, if the length of the time interval exceeds a predefined value, the transmit power is reduced, and if the length of the time interval is zero, the transmit power is increased.

If the transmit power is initially set by means of a first, low comparison value to a required value or maximum value and is then regulated by means of a second value corresponding to the required value or maximum value of the transmit power or to a value which is just slightly below the required value or maximum value of transmit power in accordance with the method described in the previous paragraph, the process or initially setting the transmit power and the process of regulating the transmit power are separated in long-term operation. The advantage of this is that regulation of both processes can be optimized separately. Instead of two comparison values a number of comparison values can also be used which correspond to further transmit powers. This method for setting the transmit power can be applied accordingly in each case. This allows the transmit power to be rapidly switched back and forth between different values. It is also possible to specify particular limits for the transmit power, for example for mutual limiting of the transmit power in a range between a maximum value and a minimum value.

If in various phases of operation of the transmit arrangement different comparison values are used (e.g., as described above, a first comparison value in the start phase of operation and a second comparison value in ongoing operation), it is advantageous to use a programmable electronic control, where programmable electronic control involves selecting from a plurality of comparison values the comparison value needed at the time concerned. This also allows simple implementation of complex closed-loop control methods. Switching between the comparison value for example occurs at fixed predefined points and/or is controlled depending on the operating state by the electronic control. This for example makes it possible to take account of the fact that a stationary transmit power does not stabilize as a rule until around 10 oscillation periods have elapsed.

With a preferred embodiment of the method the measured length of the time interval is first compared with the values stored in a table. The table values are for example stored in digital form in a digital data memory. The length values are assigned setting parameters in each case, with which the send arrangement can be set to a specific transmit power. If the length of the measured time interval matches one of the values stored in the table, the setting parameter assigned to this value is forwarded to the transmit arrangement where the transmit power is set accordingly. Instead of individual values stored in the table, intervals and ranges of values can also be stored in the table, so that, if the length of the measured time interval matches a value within a range of values stored in the table or a value within one of the intervals stored in the table, the setting parameter assigned to this range of values or interval is forwarded to the transmit arrangement. The setting parameters can in particular be digital values. This enables a digital setting device to be used as a supply device for the transmit arrangement to which the corresponding digital value is transferred as an input variable.

In a further advantageous embodiment of the invention technical defects or malfunctions of the transmit arrangement or other electrical components are detected. As with the method described above, this is typically done by comparing the measured length of the time interval with values stored in a table. When the length of the time interval assumes specific values for example or exceeds or falls below a predefined limit value, an error is diagnosed. Thus for example if the antenna current is used as a characteristic value, a defective electrical connection at the antenna can be deduced if the antenna current, despite maximum supply of energy to the transmitter station, undershoots a prespecified minimum value. When the antenna current also exceeds a predefined minimum value with minimum energy supply, a short circuit in the transmit device can be deduced for example. After a defect is detected for example a specific error signal can be generated, which can for example be an electrical error signal, an optical error signal (lighting up a light emitting diode) or an audible error signal. In automotive technology the error signal can be forwarded to a central control computer, which notifies the driver about the defect by means of a warning light in the cockpit. In the area of safety-relevant sensors in particular (for example tire pressure sensors) this is of decisive importance.

Furthermore a transmit arrangement is proposed with which the method in accordance with the invention can be executed. The transmit arrangement comprises a transmit antenna and an adjustment unit interacting with a power supply unit to supply the transmit antenna with energy, so that the transmit power of the transmit antenna can be changed. Furthermore the transmit arrangement comprises a comparison device for comparing a characteristic electrical value for the transmit power with a comparison value as well as a measuring device which is designed to measure a length of a time interval in which the characteristic value at least reaches or exceeds the comparison value, where the measuring device is connected to the comparison device. Furthermore the transmit arrangement comprises an evaluation unit which is designed to set the transmit power depending on the length of the time interval, where the evaluation unit is connected on the output side with the setting unit.

A final transmit stage can be provided which for example comprises an oscillator to generate a frequency signal and an amplifier. The transmit antenna is operated with the amplified frequency signal (e.g. a square wave signal). The final transmit stage is preferably supplied via a regulated power supply.

As is known from practical experience, the transmit antenna e.g. typically comprises an arrangement of ohmic resistors, inductors and capacitors connected in parallel and/or in series.

In particular a setting signal for the transmit arrangement is generated in the evaluation device in the proposed arrangement. This can for example be undertaken in accordance with the method described above, where the length of the measured time interval is compared with values stored in the electronic memory and a stored value assigned to the length is transmitted as setting parameter to the power supply device. This type of electronic memory is referred to as a lookup table. The execution sequence of the method can be controlled by an electronic control unit, e.g. a microprocessor or controller.

The comparison device can be a comparator, preferably a digital comparator. Since digital technology can in many cases be implemented more easily and more cheaply than analog technology, it offers significant advantages.

Furthermore a variant of the transmit arrangement is proposed, in which the comparison device has an enable input which is designed to control a timing sequence of the comparison of the input variables and where the enable input is connected to the transmit antenna and/or to a final transmit stage.

The comparison can be started and ended by a corresponding signal to the enable input. This can be done for example by the comparison only being performed if a specific minimum voltage is present at the enable input. If this voltage is not present, the comparison is not executed. This arrangement allows specific ranges of a period to be "hidden" for the comparison. The signal can especially be generated by a voltage being tapped at a point in the transmit arrangement. Preferably a rectangular frequency signal of a final transmit stage is applied to the enable input. Thus the arrangement can for example be operated in such a way that the comparison is only made when the frequency signal assumes the value "High". Instead of the output signal of the final transmit stage a mode control signal of the final transmit stage, for example a square-wave signal of a frequency generator, can be applied to the enable input. In the description below only the designation "signal of the final transmit stage" is used for both options for controlling the enable input.

The measurement device can comprise a counter, preferably a digital counter, which measures the length of the time interval. This counter is connected in this case to an output of the comparison device.

Since in sensor technology a miniaturization of the electronics is of decisive importance, it is advantageous to partly or fully integrate the above arrangement into an Application-Specific Integrated Circuit (ASIC) or to implement it as an ASIC. In particular the power supply unit, the comparison device, the measuring device, the evaluation device and optionally the final transmit stage are integrated into an ASIC. The integration of the electronics not only leads to a miniaturization of the arrangement but can also significantly reduce the costs of manufacturing the arrangement in series production.

The scope of the invention further includes a computer program product which executes the method in one of its embodiments, when run on a computer or computer network.

Furthermore the scope of the invention includes a computer program product with program code means to execute the method in accordance with the invention in one of its embodiments when the program is executed on a computer or computer network. In particular the program code means can be stored on a computer-readable data medium.

The scope of the invention also includes a data medium on which a data structure is stored, which after loading into the RAM or main memory of a computer or computer network can execute the inventive method in one of its embodiments.

The scope of the invention also includes a computer program product with program code means stored on a machine-readable medium to execute the inventive method in one of its embodiments when the program is run on a computer or computer network.

In this case a computer program product is taken to mean the program as a salable product. It can basically be available in any form, for example on paper or a computer-readable data medium, and can especially be distributed over a data transmission network.

BRIEF DESCRIPTION OF THE DRAWINGS

The invention is explained in more detail below using exemplary embodiments which are shown schematically in the figures. It is however not restricted to the examples. The same reference numbers in the individual Figures designate the same or functionally equivalent elements or elements which correspond to each other in respect of their functions. In detail the figures show.

DETAILED DESCRIPTION OF EMBODIMENTS

Figure 1:
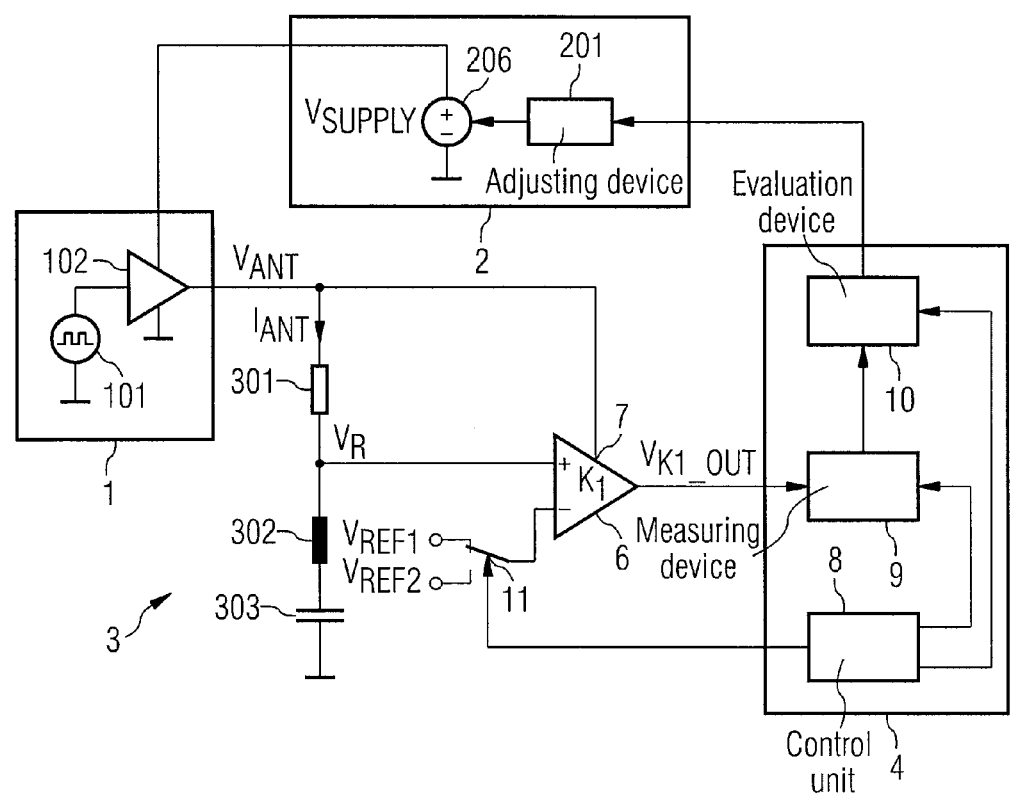
FIG. 1 a schematic presentation of a transmit arrangement in accordance with the best embodiment of the invention with an adjustable power supply unit, a final transmit stage, a transmit antenna, a comparison device, a control unit, a measuring device and an evaluation device.

FIG. 1 shows a final transmit stage 1, a power supply unit 2, a transmit antenna 3, a control module 4 and a comparison device 6.

The final transmit stage 1 comprises an oscillator 101 which is connected to a signal input of an amplifier 102. An output of the amplifier 102 is connected to the transmit antenna 3 which is formed by a series circuit an ohmic resistor 301, an inductor 302 and a capacitor 303. The ohmic resistor 301 is connected to the output of the amplifier 102. The capacitor 303 is connected to ground potential. Via a connection arranged between the ohmic resistor 301 and the inductor 302 a first input of the comparison device 6 is connected to the transmit antenna 3. Furthermore the output of the amplifier 102 is connected to an enable input 7 of the comparison device 6.

A second input of the comparison device 6 is connected to a terminal, in which case the electrical potential of this terminal can be switched back and forth by means of a switch 11 between the comparison voltages $V_{REF1}$ and $V_{REF2}$. An adjusting device of the switch 11 is connected to an output of a control unit 8 of the control module 4.

An output of the comparison device 6 is connected to an input of a measuring device 9 of the control module 4. A control output of the measuring device 9 is connected to an output of the control unit 8. An output of the measuring device 9 is connected to an input of an evaluation device 10 of the control module 4. Furthermore an input of the evaluation device 10 is connected to an output of the control unit 8. An output of evaluation device 10 is connected to an input of the power supply unit 2. The power supply unit 2 comprises an adjusting device 201 and an adjustable voltage source 206 connected to the adjusting device 201. An output of the power supply unit 2 is connected to an input of the final transmit stage 1.

The power supply unit 2 in this exemplary embodiment is preferably a digital voltage regulator, wherein the digital voltage regulator is embodied in such a way that the transmit power of a transmit arrangement can be set by a digital input signal at an input of the power supply unit 2. The power supply unit 2 is connected on the output side to the final transmit stage 1, in which case a change to a supply voltage $V_{SUPPLY}$ present at an output of the power supply unit causes a change in the amplitude of the output signal of the final transmit stage 1. It is advantageous here for the output voltage $V_{ANT}$ of the final transmit stage to represent a known function of the supply voltage $V_{SUPPLY}$. This makes it easier to set the transmit power.

An output signal of the oscillator 101 is shown schematically in this exemplary embodiment as a square-wave signal. Other signal forms are also possible. In automotive technology a send frequency of 125 kHz is used for example.

The transmit antenna 3 is embodied as a series resonant circuit with a series circuit of an ohmic resistor 301, an inductor 302 and a capacitor 303. Instead of one of the given elements in each case, combinations of a number of ohmic resistors, inductors and capacitors are conceivable.

A comparison device 6, here a digital comparator, comprises a voltage signal input to which a voltage signal is fed which is connected to the terminal of the transmit antenna arranged between the ohmic resistor 301 and the inductor 302 is connected, so that the falling voltage $V_R$ relative to ground potential can be applied to the voltage signal input.

Figure 8:
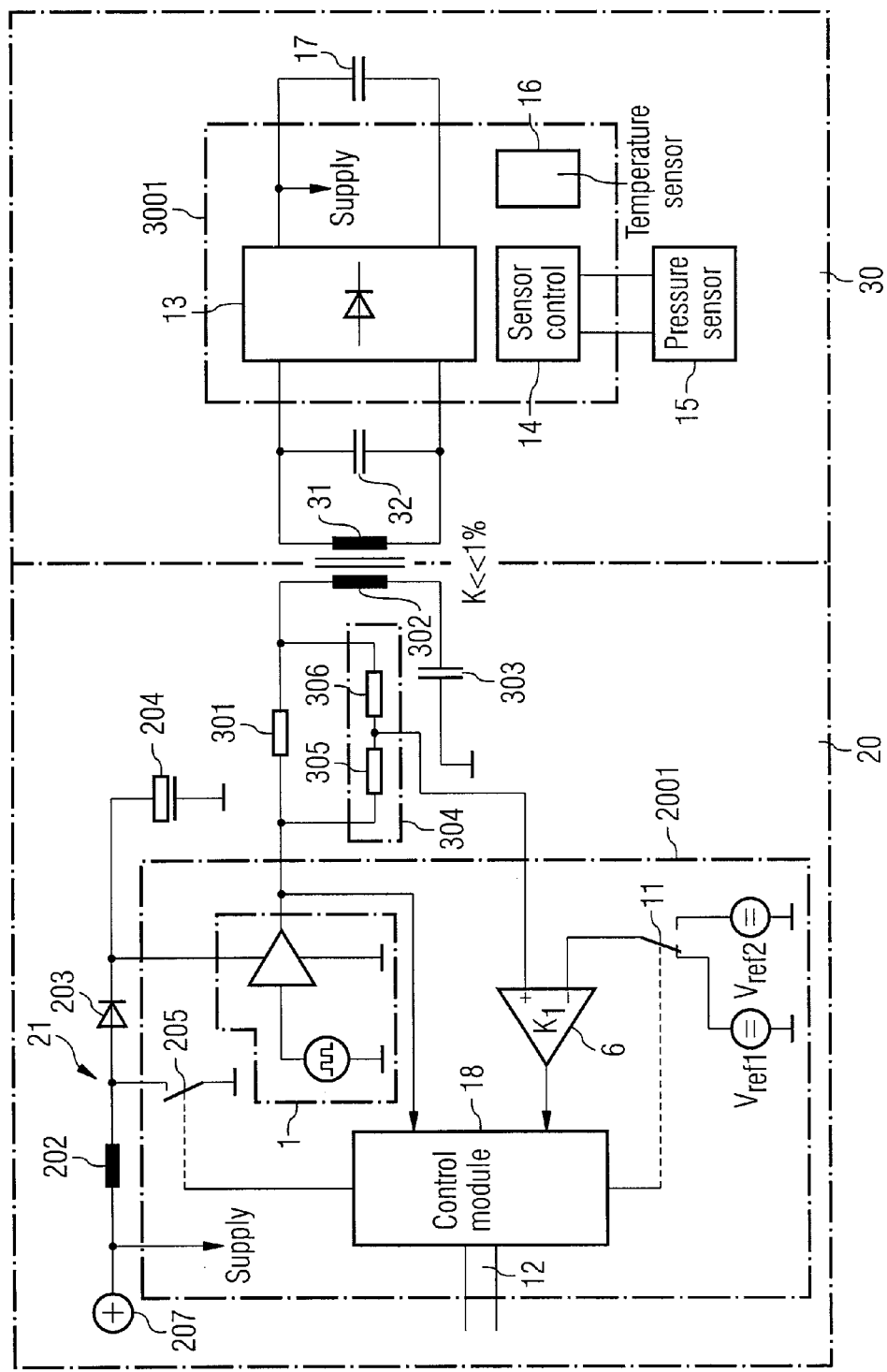
FIG. 8 a base station and a transponder device.

Alternatively the input voltage signal can be tapped off at a measurement resistor (not shown) connected in parallel to the ohmic resistor 302 or a voltage divider (see for example embodiment in accordance with FIG. 8). This is of advantage especially with high transmit power for which the falling voltages via the ohmic resistor of the transmit antenna would exceed the permissible input voltage of the comparator. In addition the voltage divider can be used to help adapt the comparison device 6 in a simple and cost-saving way to different transmit devices. This is of benefit in automotive technology, where for example different transmitter devices are to be used for different vehicle models.

The comparator is equipped with an enable input 7. Since the final transmit stage 1 is connected to the enable input, the voltage signal of the final transmit stage $V_{ANT}$ can be used to control the comparison of the voltage $V_R$ with the comparison voltage $V_{REF1}$ or $V_{REF2}$.

Instead of applying the antenna voltage $V_{ANT}$ directly between the enable input and ground potential this can also be modified initially. This modification can for example be undertaken in the form of adaptation of the voltage level to the voltage level of the enable input or the form of an inversion.

In this version two different reference voltages $V_{REF1}$ and $V_{REF2}$ are provided as comparison values. The comparison value required in each case is selected via a switch 11, which is activated by a control unit 8. This control unit makes it possible for different comparison voltages to be used in different operating phases of the transmit arrangement, which also enables more complex closed-loop control processes to be performed. In an alternative embodiment more than two comparison voltages can optionally be applied to the corresponding input of the comparison device 6.

The output of the digital comparator is connected to a measuring device 9 which in this exemplary embodiment is a digital counter.

This counter (by for example counting the duty or clock cycles of a clock), measures for how long the output signal of the comparator $V_{K1\_OUT}$ assumes a value other than zero during a period. The length of this time interval is forwarded from the measuring device 9 to an evaluation device 10, which, like the counter itself, is controlled by the control unit 8. In the evaluation device 10 a corresponding setting signal for the setting device 201 of the power supply unit 2 is generated from the length of the time interval and is forwarded to the latter. This setting signal is preferably a digital counter value. The setting signal can for example be created by comparing the time interval with values and parameters stored in a lookup table.

Figure 2:
FIG. 2 a timing diagram of the antenna voltage $V_{ANT}$ present at the transmit antenna in accordance with FIG. 1.
Figure 3:
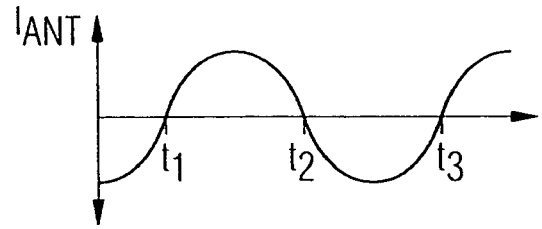
FIG. 3 an antenna current waveform $I_{ANT}$ for the current flowing through the antenna in accordance with FIG. 1.
Figure 4:
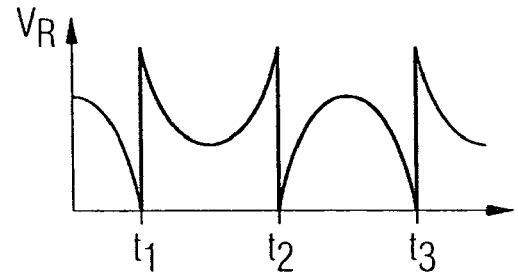
FIG. 4 the voltage $V_R$ dropping off against ground potential at the connection between the resistor and the inductor of the transmitter antenna, according to FIG. 1.

FIGS. 2 to 7 show the timing waveform of the main characteristic variables which occur in the exemplary embodiment in accordance with FIG. 1 for typical operation of the transmit arrangement. The voltage signal $V_{ANT}$ generated by the final transmit stage is shown in FIG. 2. This signal is a square-wave signal. The current through the transmit antenna 3 is shown in FIG. 3, the waveform of the voltage $V_R$ falling against ground potential at a connection between resistor 301 and inductor 302 of the transmit antenna in accordance with FIG. 1 in FIG. 4.

Figure 5:
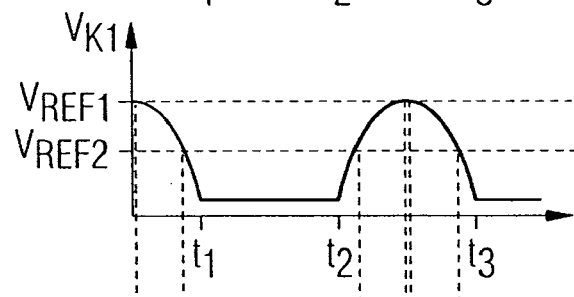
FIG. 5 a waveform of the voltage $V_{K1}$ present at the comparison unit in accordance with FIG. 1, taking account of the antenna voltage $V_{ANT}$ of the final transmit stage present at the enable input.

The antenna signal $V_{ANT}$ which controls the timing of the comparison of voltage $V_R$ with the comparison voltage $V_{REF1}$ or $V_{REF2}$ is present at enable input 7. This is done by only performing the comparison if a signal with a low signal level in accordance with FIG. 2 is present at the enable input (for example between the times $t_2$ and $t_3$). If a higher signal level is present at the enable input (i.e. between the times $t_1$ and $t_2$ for example), the comparison is not possible. FIG. 5 shows the signal $V_{K1}$ used for the comparison which is produced from the voltage $V_R$ in accordance with FIG. 4 so that when a signal with a high level is present at the enable input (for example between the times $t_1$ and $t_2$), the value of zero is assigned to the signal $V_{K1}$, and when a signal with a low signal level is present at the enable input (for example between the times $t_2$ and $t_3$), the signal $V_{K1}$ assumes the same value as the voltage $V_R$.

To clearly show the option of applying the first or second comparison voltage to the comparison device, the comparison voltage symbols $V_{REF1}$ and $V_{REF2}$ are inserted into the drawing.

Figure 6:
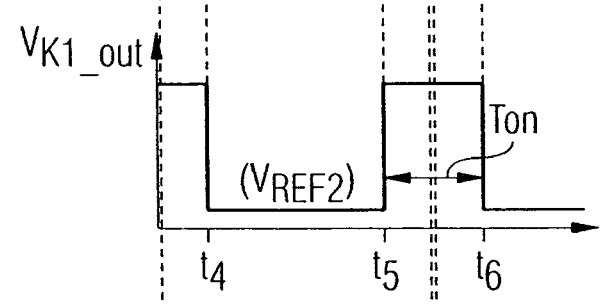
FIG. 6 a waveform of the output signal $V_{K1\_OUT}$ at the comparison device in accordance with FIG. 1 when a first comparison voltage $V_{REF1}$ is applied.
Figure 7:
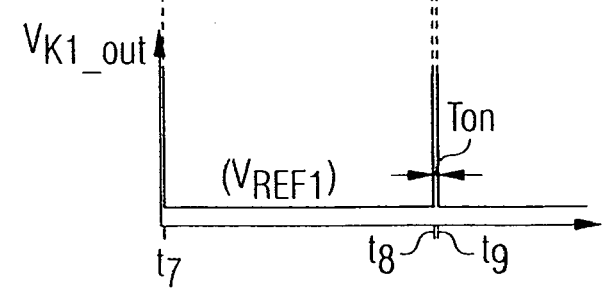
FIG. 7 a waveform of the output signal $V_{K1\_OUT}$ of a comparison device in accordance with FIG. 1 when a second comparison voltage $V_{REF2}$ is present.

Only when the signal $V_{K1}$ at least reaches or exceeds the relevant comparison voltage or if $V_{K1}$ exceeds the comparison value does the signal $V_{K1\_OUT}$ at the output of the comparison device assume a high value ("high" or "1"). This is shown in FIGS. 6 and 7 for the comparison voltage $V_{REF2}$ or $V_{REF1}$.

Between the times $t_4$ and $t_5$ in FIG. 6 the signal $V_{K1}$ is below the comparison voltage $V_{REF2}$, and the output signal $V_{K1\_OUT}$ of the comparison device assumes a low signal level. At time $t_5$ the signal $V_{K1}$ exceeds the comparison voltage $V_{REF2}$, and the output signal $V_{K1\_OUT}$ assumes a high signal level until (at time $t_6$) the signal $V_{K1}$ falls below the comparison voltage $V_{REF2}$ again. The time difference between the times $t_5$ and $t_6$ is identified by $T_{ON}$. Similarly FIG. 7 shows the waveform of the output signal $V_{K1\_OUT}$ of the comparison device for comparison of the signal $V_{K1}$ with the comparison voltage $V_{REF1}$. Here $V_{K1\_OUT}$ assumes a high signal level between times $t_8$ and $t_9$ whereas between times $t_7$ and $t_8$ a low signal level is assumed. The period of time for which the comparison voltage $V_{REF1}$ is exceeded is in this case smaller than in FIG. 6.

FIGS. 2 to 7 can also be used to demonstrate how the enable input 7 operates. If voltage signal $V_{K1}$ were not used as input signal of the comparator but voltage signal $V_R$ directly, then in FIG. 4 the voltage signal $V_R$ would already exceed the comparison voltage $V_{REF2}$ at time $t_1$. This would set the output signal $V_{K1\_OUT}$ to "high" and the digital counter of the measuring device 9 would be started. Under some circumstances the voltage signal $V_R$ would fall below and rise above the comparison voltage $V_{REF2}$ again even during the interval between the times $t_1$ and $t_2$. The counter would thus be switched on twice during a half wave of the antenna stream $I_{ANT}$.

It is thus advantageous to only conduct the comparison during every second half wave of the antenna current $I_{ANT}$. This corresponds to the interval between the times $t_2$ and $t_3$ in the example. The digital counter is thus started at time $t_5$ and stopped at time $t_6$. The comparison is controlled accordingly, as described above, by the voltage signal $V_{ANT}$ being applied to the enable input.

An example to explain the complete method for setting the transmit power is now given with reference to FIG. 6 and FIG. 7. First the power supply device is set to a minimum value. Then the transmit process is started and the antenna current oscillates to its final value. After a settling time the voltage signal $V_{K1}$ is compared to the lower comparison voltage $V_{REF2}$ and the length of the time $T_{ON}$ determined according to FIG. 6. This measured length, as described above, is compared with values stored in a table in order to determine a setting parameter for the power supply unit. This setting parameter, which can for example be a digital value, is transferred to the power supply unit. The power supply unit sets the transmit power in accordance with the setting parameter. After a new settling time the voltage signal $V_{K1}$ is then compared with the higher comparison voltage $V_{REF1}$ and the length of time $T_{ON}$ (FIG. 7) determined. The comparison voltage $V_{REF1}$ is selected so that it corresponds to a transmit power which lies slightly below the target required value. If the length of time $T_{ON}$ exceeds a prespecified value, the transmit power is lowered accordingly. If the size is greater than zero but not greater than the prespecified value, the transmit power used at that point can be retained. If the length is zero, the transmit power is preferably increased slightly, e.g. increased by the amount equivalent to the difference between the required value and the transmit power corresponding to the comparison voltage $V_{REF1}$.

Optionally (for example when the length of time assumes the value zero) a comparison of the voltage signal $V_{K1}$ with the lower comparison voltage $V_{REF2}$ can again be made.

FIG. 8 shows an arrangement featuring a base station 20 and a transponder device 30. The elements and components of the base station shown in FIG. 8 are designed and connected to each other especially as described with reference to FIG. 1. There are however differences which will be explicitly examined below.

The power supply unit is embodied as a switched mode regulator 21 in this exemplary embodiment. An inductor 202, a diode 203 and a storage capacitor 204 are connected in series, in which case the diode 203 is connected to ground potential via storage capacitor 204 and connected via the inductor 202 to an external power supply unit 207. A connection arranged between the inductor 202 and the diode 203 is connected via a switch 205 to chassis potential. A setting device of switch 205 is connected to an output of a control module 18. A connection lying between the diode 203 and the storage capacitor 204 is connected to the supply input of the final transmit stage 1.

During operation of the switched mode regulator 21 the storage capacitor 204 is charged via the diode 203 for as long as switch 205 is open. Opening and closing switch 205 allows the voltage present at storage capacitor 204 to be set which is at the same time the supply voltage of the final transmit stage 1.

Furthermore in this design there is voltage divider 304 with ohmic resistors 305, 306 switched in parallel to ohmic resistor 301 of the transmit antenna. An intermediate tap of the voltage divider 304 arranged between the resistors 305, 306 is connected to an input of a comparison device 6. The voltage $V_R$ used as the characteristic value for the transmit power is thus tapped off in this exemplary embodiment at the intermediate tap. This prevents an overvoltage at the input of the comparison device 6.

An output of the final transmit stage 1 is not, as in the exemplary embodiment of FIG. 1, connected directly to the enable input of the comparison device 6, but is connected to control module 18. Control module 18 comprises a control device, a measuring device and an evaluation device and is programmable via an interface 12. Control module 18 is designed so that it only enables the length of the time interval to be measured during specific time segments of the period which are defined by the signal of the final transmit stage $V_{ANT}$. For example the length of the time interval is only measured if the signal of final transmit stage $V_{ANT}$ in accordance with FIG. 2 assumes a lower signal level, for example between the times $t_2$ and $t_3$. To do this, a digital counter of the measuring device in the control module 18 can be switched on and off by the signal of the final transmit stage $V_{ANT}$. Otherwise the control module 18 is embodied like the control module 4 in accordance with FIG. 1.

The further components and the functioning of the exemplary embodiment are the same or function in the same way as the components of the base station described in FIG. 1. The measured length of the time interval TON is compared with values stored in a table, as in the exemplary embodiment described in FIG. 1. According to the parameters also stored in the table for these values, the control module 18 activates the switch 205 of the switched mode regulator, which charges the storage capacitor 204 accordingly and sets the voltage at the final transmit stage 1 and thereby the transmit power.

The transponder device 30 comprises a parallel circuit of an inductor 31 and of a capacitor 32. Connections lying on opposite sides of the parallel circuit are each connected to an alternating current input of a rectifier 13. Two alternating current outputs of the rectifier 13 are each connected to a connection of a storage capacitor 17. Furthermore the transponder device comprises a sensor control 14 connected to a pressure sensor 15 and a temperature sensor 16.

The transponder device 30 is used in this arrangement for monitoring pressure and temperature in an automobile tire and accordingly comprises a pressure sensor 15 and a temperature sensor 16. Energy is supplied to the transponder device by charging up the storage capacitor 17 via the rectifier 13 on receiving signals of the base station. The base station can supply a number of transponders with data and/or energy.

In particular one of the transponder devices 30 in each case is arranged in a wheel of a road vehicle and an associated base station 20 in the vicinity of the vehicle wheel in each case. During the journey the wheels execute with the transponder devices rotational or rolling movements while the base stations move with the vehicle and thus do not execute the rotational movement. The base stations 20 are for example connected to a central control computer of the vehicle.

The base station 20 can also comprise a receiver device not shown here with which signals sent back from the transponder device to the base station can be received. Accordingly the transponder arrangement 30 can in this case comprise another transmitter station which is also not shown here.

This arrangement can be operated as follows: The control computer requests pressure and/or temperature values of all wheels during a recurring cycle, to enable it to identify deviations from required values or required ranges of tire pressures of the wheels. To do this it accesses the base stations 20 in turn, which, as described, first set the transmit power of the transmit antenna to a required value and/or maximum value and then keep to the required value and/or maximum value for a time sufficient to supply energy to the associated transponder device 30. Receipt of the corresponding transmit signal triggers measurement of the temperature in the wheel and corresponding measured values are returned to the base station 20, received there and forwarded to the control computer.

FIG. 8 also shows examples of integration of specific components of the base station 20 into a first ASIC (2001) and specific components of the transponder device 30 into a second ASIC (3001). Integrated into the ASIC (2001) are the final transmit stage 1, the switch 205, the comparison device 6, the switch 11 and the control module 18. The antenna resonant circuit (301, 302, 303) and the voltage divider 304 are in this example not part of the ASIC. Also, the inductor 202, the diode 203 and the storage capacitor 204 of the switched mode regulator are not integrated.

The invention is however not restricted to this specific arrangement, other arrangements and forms of integration are possible. Thus for example the receiver device not shown in this figure for signals returned from the transponder device 30 to the base station 20 and a corresponding evaluation logic can be components of the ASIC 2001 of the base station.

The ASIC 3001 of the transponder device comprises a rectifier 13, a sensor control 14 and a temperature sensor 15. As already described above, the transponder device and the ASIC 3001 can also comprise a transmit arrangement not shown here, for transmission of signals back to the base station, as well as evaluation electronics also not shown in this schematic arrangement for processing the sensor signals.

We claim:

1. A method for setting a transmit power of a transmit antenna, especially for transmission of electrical energy by electromagnetic waves to a transponder device, comprising the steps of:

comparing a characteristic electrical value for a send power to a comparison value, measuring a length of a time interval in which the characteristic electrical value at least reaches or exceeds the comparison value or in which the characteristic electrical value exceeds the comparison value, and setting the transmit power, depending on the length of the time interval.

2. The method in accordance with claim 1, wherein the characteristic electrical value for the transmit power is an electrical voltage tapped off at the transmit antenna.

3. The method in accordance with claim 1, wherein the comparison value is an electrical reference voltage.

4. The method in accordance with claim 1, wherein the characteristic electrical value exhibits a periodic curve, the characteristic electrical value is repeatedly compared with the comparison value, and the comparison of the characteristic electrical value with the comparison value and/or the measurement of the length of the time interval controlled by the periodic curve of the characteristic electrical value and/or by a periodic control variable is made possible at particular times.

5. The method in accordance with claim 1, wherein one of a required value or a maximum value of the transmit power corresponds to a value of the characteristic electrical value, the comparison value is selected so that it corresponds to a transmit power lying below one of the required value or the maximum value, a start transmit power is selected, the length of the time interval for the start transmit power is measured, and the length of the time interval is used to determine the value to which a setting variable and thereby the transmit power is to be set, so that the required value or maximum value of the transmit power is reached.

6. The method in accordance with claim 1, wherein the comparison value is selected so that it corresponds to one of: (i) half of the required value, (ii) the maximum value, (iii) a value deviating by not more than 10% from half of the required value, or (iv) a value deviating by not more than 10% from half of the maximum value.

7. The method in accordance with claim 1, wherein the comparison value is selected so that is corresponds to a value lying below a required value or maximum value of the transmit power, the length of the time interval is measured at a set transmit power, if the length of the time interval exceeds a predefined value, the transmit power is lowered, and if the length of the time interval is zero, the transmit power is increased.

8. The method in accordance with claim 1, wherein the measured length of the time interval is initially compared with values stored in a table, the table comprises setting parameters assigned to the stored values for setting the transmit power, and a setting parameter corresponding to the measured length of the time interval is determined from the table and the transmit power is set.

9. The method in accordance with claim 1, wherein a technical defect of a transmit device including the transmit antenna and/or a technical defect of other electrical components is deduced if the measured length of the time interval assumes specific predefined values or exceeds or falls below as predefined limit value.

10. A transmit arrangement, especially for transmission of electrical energy by means of the electromagnetic waves sent by the transmit arrangement to a transponder device, wherein the transmit arrangement comprises:
a transmit antenna,
a setting device having an input side and an output side which interacts with a supply device to supply the transmit antenna with energy, so that a transmit power of the transmit antenna can be changed,
a comparison device to compare a characteristic electrical value for the transmit power with a comparison value,
a measuring device which is embodied to measure a length of a time interval in which the characteristic electrical value at least reaches or exceeds the comparison value or in which the characteristic electrical value exceeds the comparison value, where the measuring device is connected to the comparison device, and
an evaluation device which is embodied to set the transmit power, depending depending on the length of the time interval, the evaluation device connected to the setting device on the output side of the setting device.

11. The transmit arrangement in accordance with claim 10, wherein the transmit arrangement comprises a final transmit stage and an adjustable power supply unit.

12. The transmit arrangement in accordance with claim 10, wherein the comparison device comprises a comparator.

13. The transmit arrangement in accordance with claim 10, wherein the comparison device comprises an enable input configured to allow the comparison of the characteristic value with the comparison value, depending on a signal which is present at the input, wherein the enable input is connected to the transmit antenna and/or to a final transmit stage.

14. The transmit arrangement in accordance with claim 10, wherein the measuring device comprises a counter to determine the length of the time interval, wherein the counter is connected to an output of the comparison device.

15. The transmit arrangement in accordance with claim 10, wherein an Application-Specific Integrated Circuit (ASIC), comprises the supply device, the comparison device, the measuring device and the evaluation device.

16. A computer readable medium encoded with software for setting a transmit power of a transmit antenna, especially for transmission of electrical energy by electromagnetic waves to a transponder device, the software embodied in said computer readable medium and when executed operable to:
compare a characteristic electrical value for a send power to a comparison value,
measure a length of a time interval in which the characteristic electrical value at least reaches or exceeds the comparison value or in which the characteristic electrical value exceeds the comparison value, and
set the transmit power, depending on the length of the time interval.

17. The software in accordance with claim 16, wherein the electrical value for the transmit power is an electrical voltage tapped off at the transmit antenna.

18. The software in accordance with claim 16, wherein the comparison value is an electrical reference voltage.

19. The software in accordance with claim 16, wherein the electrical value exhibits a periodic curve, the software further operable to:
repeatedly compare the characteristic electrical value with the comparison value, and
make the comparison of the characteristic electrical value with the comparison value and/or the measurement of the length of the time interval controlled by the periodic curve of the characteristic electrical value and/or by a periodic control variable possible at particular times.

20. The software in accordance with claim 16, wherein a required value or maximum value of the transmit power corresponds to a value of the electrical value, the software further operable to:
select the comparison value so that it corresponds to a transmit power lying below the required value or maximum value,
select a start transmit power,
measure the length of the time interval for the start transmit power, and
based on at least the length of the time interval, determine the value to which a setting variable and thereby the transmit power is to be set, so that the required value or the maximum value of the transmit power is reached.

21. The software in accordance with claim 16, further operable to select the comparison value so that it corresponds to one of: (i) half of the required value, (ii) the maximum value, (iii) a value deviating by not more than 10% from half of the required value, or (iv) a value deviating by not more than 10% from half of the maximum value.

22. The software in accordance with claim 16, further operable to:
select the comparison value so that is corresponds to a value lying below a required value or maximum value of the transmit power,
measure the length of the time interval at a set transmit power,
lower the transmit power if the length of the time interval exceeds a predefined value, and
increase the transmit power if the length of the time interval is zero.

23. The software in accordance with claim 16, further operable to:
initially compare the measured length of the time interval with values stored in a table, wherein the table comprises setting parameters assigned to the stored values for setting the transmit power, and
determine a setting parameter corresponding to the measured length of the time interval from the table and for setting the transmit power.

24. The software in accordance with claim 16, further operable to deduce a technical defect of a transmit device including the transmit antenna and/or a technical defect of other electrical components if the measured length of the time interval assumes specific predefined values or exceeds or falls below a predefined limit value.

* * * * *